June 14, 1955   M. E. DROZ ET AL   2,710,722
SCORING MECHANISM FOR TRAINERS
Filed April 5, 1946   2 Sheets-Sheet 2

INVENTORS
RAYMOND L. GARMAN
MARCEL E. DROZ
ROBERT U. NATHE
BY
ATTORNEY

United States Patent Office 2,710,722
Patented June 14, 1955

2,710,722
SCORING MECHANISM FOR TRAINERS

Marcel E. Droz, Cambridge, Mass., Raymond L. Garman, Flushing, N. Y., and Robert U. Nathe, Minneapolis, Minn., assignors, by mesne assignments, to the United States of America as represented by the Secretary of the Navy Application April 5, 1946, Serial No. 659,718

7 Claims. (Cl. 235—61.5)

This invention relates in general to computers and in particular to error computers used in torpedo fire control training mechanisms.

Trainer mechanisms used for torpedo fire control training consist of a plurality of servo mechanisms, computers, and indicators with various shaft rotations and voltages representing the courses, speeds, and relative bearings of own vessel and target vessel. The rotations and voltages are combined and presented on indicators to give a student operator a simulated picture of the fire control problem. In this type of trainer it is convenient to resolve the range and bearing information into Cartesian coordinates having north-south and east-west axes. When the student operator solves the problem and fires a mythical torpedo, its coordinates of course and speed combined with the target's coordinates of range, course, and speed are used to determine the error distance from interception between the torpedo and the target.

It is the principal object of this invention to provide a scoring mechanism for such a trainer consisting of an error computer and scoring chart arranged to indicate the error distance from interception almost instantly after firing the torpedo, thus enabling a rapid computation of indivdual scores when a spread of shots are fired.

Other and further objects of this invention will be apparent from the following specification when taken with the accompanying drawings in which.

The principal embodiment of this invention consists of two time-of-run servo computers connected together differentially so that their difference output indicates a time interval which when multiplied by the velocity indicates the error distance from interception.

Figure 2:
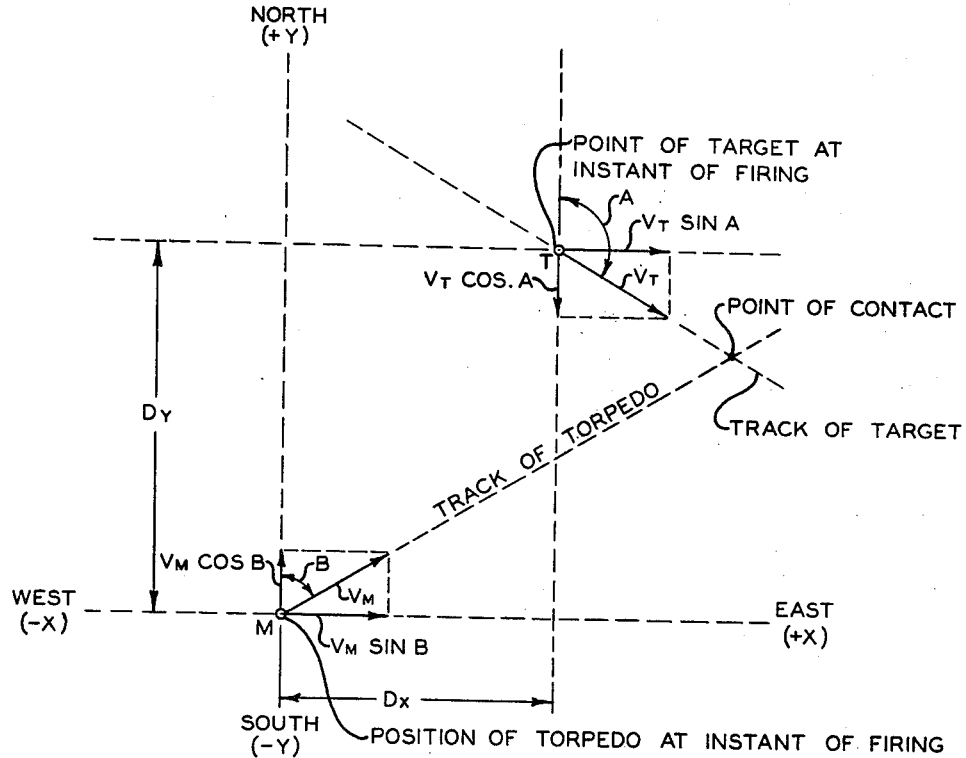
Fig. 2 is a mathematical diagram used to show the operation of Fig. 1.

As mentioned earlier, the various informations are resolved into Cartesian coordinates having N-S and E-W axes, or, as more commonly expressed, $x$- and $y$-axes. The mathematical solution required of the error computer can best be shown with reference to Fig. 2. Here is represented the distance and velocity relationships of the target ship and the torpedo at the instant of firing, with the torpedo M at the center of the coordinate system and the target vessel T at some other point. The various symbols used are:

$D_x$ = distance from torpedo to target in $x$-direction;
$D_y$ = distance from torpedo to target in $y$-direction;
$V_M$ = speed of torpedo;
$B$ = torpedo course angle with respect to North;
$V_T$ = speed of target vessel;
$A$ = target course angle with respect to North;
$dV_x$ = relative speed in $x$-direction;
$dV_y$ = relative speed in $y$-direction;
$t_x$ = time required for $x$-direction interception;
$t_y$ = time required for $y$-direction interception; and
$d_t$ = time difference between $t_x$ and $t_y$ As is apparent from the geometry of Fig. 2, the velocity components of $V_M$ and of $V_T$ in the $x$- and $y$-directions respectively are $V_M \sin B$, $V_M \cos B$, $V_T \sin A$, and $V_T \cos A$; and the relative velocities in the $x$- and $y$-direction are:

(1) $$dV_x = V_T \sin A - V_M \sin B$$

and (2) $$dV_y = V_T \cos A - V_M \cos B$$

If the $x$- and $y$-coordinates of the distance between the torpedo and the target are divided by the respective $x$- and $y$-relative velocities, the results will be the time of travel of the torpedo to cover the distances $D_x$ and $D_y$ respectively, thus:

(3) $$\frac{D_x}{dV_x} = t_x$$

and (4) $$\frac{D_y}{dV_y} = t_y$$

It is readily apparent that for the torpedo to collide with the target vessel, $t_x$ must be equal to $t_y$. Any difference in the times $t_x$ and $t_y$ indicates that the torpedo will not collide with the target. If the $x$- and $y$-components of the relative velocity are multiplied by this time difference, the results will be the error distances from interception in the $x$- and $y$-directions, which points can be used to determine the score for each firing.

Figure 1:
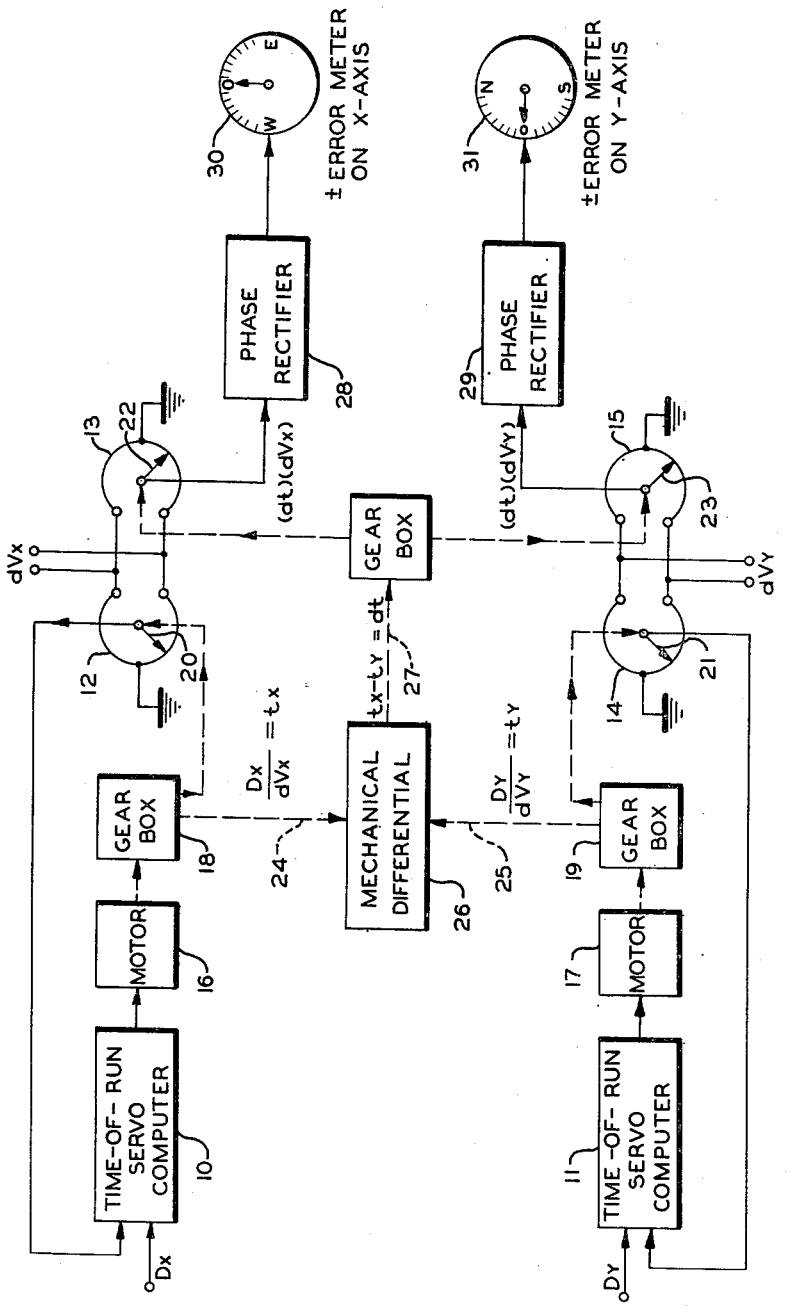
Fig. 1 is a block diagram of the error computer.

Referring to the block diagram Fig. 1, voltages from the training mechanism representing the distances $D_x$ and $D_y$ are fed into time-of-run servo computers 10 and 11 respectively. Voltages from the training mechanism representing the relative velocities $dV_x$ and $dV_y$ are fed into potentiometers, $dV_x$ into potentiometers 12 and 13 and $dV_y$ into potentiometers 14 and 15. Shaft 20 of potentiometer 12 is rotated through gear box 18 and motor 16 from the output of servo computer 10 and the electrical output from shaft 20 of potentiometer 12 is used as a second input to servo computer 10. As is apparent to those versed in the art, the rotation of output shaft 24 is the quotient of the one input divided by the other, in this case the components are arranged so that the output is $D_x$ divided by $dV_x$ which equals $t_x$. The $y$-coordinate error computer 11 is operated exactly the same as computer 10 and therefore the rotation of shaft 25 is $D_y$ divided by $dV_y$ which equals $t_y$. Shafts 24 and 25 are connected to the inputs of mechanical differential 26 which has its gearing so arranged that the rotation of output shaft 27 is the difference in rotation of the two input shafts 24 and 25. Thus, because the rotation of shaft 24 represents $t_x$ and the rotation of shaft 25 represents $t_y$, the rotation of shaft 27 represents $dt$, the time difference of the $x$ and $y$ interception. Shaft 27 positions arms 22 and 23 of potentiometers 13 and 15 respectively and therefore the electrical outputs from arms 22 and 23 are equivalent to the products of the time difference $dt$ and the relative velocity components $dV_x$ and $dV_y$ respectively, that is the output from arm 22 is equivalent to the $x$-axis error distance from interception and the output from arm 23 is equivalent to the $y$-axis error distance from interception. The potentiometers used are all center tapped to ground so that their outputs will indicate direction as well as magnitude. The outputs from arms 22 and 23 are fed through phase rectifiers 28 and 29 respectively and applied to the zero-center meters 30 and 31 respectively which are calibrated to indicate the magnitude of error distance from interception in the E-W and N-S directions. A preferred form of phase rectifier circuit consists of two triode electron tubes energized in phase opposition at their plates from an alternating source having the same frequency as the signal from shaft 22. The signal from shaft 22 is applied to the two grids in phase. The zero center meter is connected between the anode load circuits of the two detector tubes.

It is readily apparent that at the instant of firing the torpedo the voltages representing distance, speed, and direction of the torpedo and target vessel will be combined and indicate the magnitude and direction of the error distance without waiting for the time of travel of the torpedo to elapse.

Figure 3:
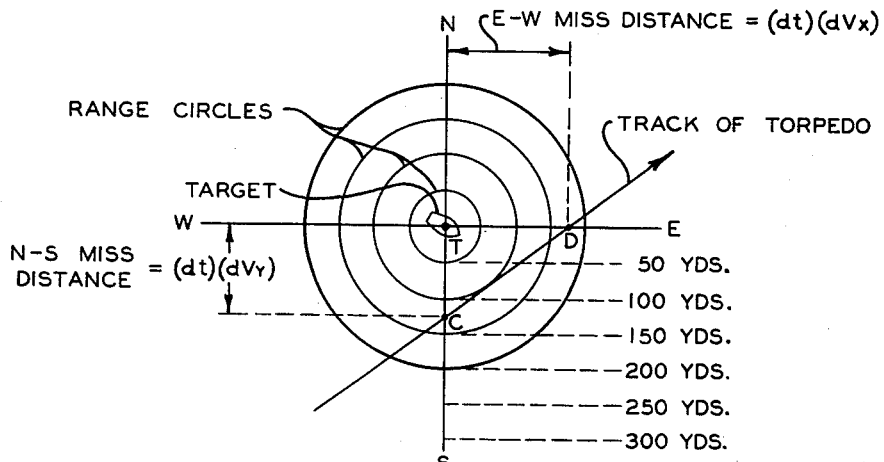
Fig. 3 is a scoring chart.

One form of scoring chart which can be used is shown in Fig. 3. In this arrangement the target vessel is positioned at the center of the coordinate system and the target model T is oriented by mounting it on the shaft of a synchro unit that has fed to it the target course. Concentric range circles are drawn around the target model to indicate appropriate error distances.

The x- and y-error distances as indicated on error meters 30 and 31, Fig. 1, are plotted on the scoring chart, Fig. 3, as points D and C. The line connecting these points is the torpedo course with respect to the target T. Since $dt$ is an elapsed time, it is constant for all three sides of triangle CDT and thus indicates the time required for the torpedo to pass from point C to point D. The distances TC and TD are components of error distance in the N-S and E-W directions respectively and from the geometry of Fig. 3 it is apparent that the actual error distance from interception will be the perpendicular distance from point T to line CD. Thus the solution is complete and unique for each problem.

It is readily apparent that if the outputs from the phase rectifiers 28 and 29 of Fig. 1 are fed to the mechanism that controls the time and direction of fire of the torpedo, the system then becomes a fire control computer.

In certain other embodiments of the invention, it may be desirable to generate the signals representing $D_x$ and $dV_x$ in terms of D. C. voltages. If this is done, certain changes may be required in computer 10 and the phase rectifier 28 may be eliminated, but these changes are in the way of simplification and readily suggest themselves upon a study of the preferred embodiment of the invention.

It is not intended that this invention be limited to the details as set forth in this specification, but is to be limited only by the following claims.

What is claimed is:

1. Apparatus for computing the error distance from interception between first and second moving bodies comprising two servo mechanisms, means for energizing said first servo mechanism at first and second inputs, respectively, with a voltage proportional to a first component of the distance between said moving bodies and a voltage proportional to the component of the relative velocity of said two bodies in the direction of said first distance component, means for energizing said second servo mechanism at first and second inputs, respectively, with a voltage proportional to a second component of the distance between said moving bodies and a voltage proportional to the component of the relative velocity of said two bodies in the direction of said second distance component, said servo mechanisms being arranged so that the output of each is proportional to the quotient of said distance component divided by said relative velocity component, means for connecting together differentially said servo mechanisms so that their combined output is the difference between the outputs of each separately, said combined output thus being proportional to a time interval, means for multiplying said time interval by aforesaid voltage components of relative velocity, said products each being a voltage proportional to the error distance from interception between the two said moving bodies each being measured along a separate axis of said Cartesian coordinate system, and means for applying said voltages proportional to said error distance to two indicating means so calibrated to indicate the actual error distances along said coordinate axes.

2. Apparatus for computing the error distance from interception between two moving bodies comprising means for energizing a servo mechanism with voltages proportional to the east-west component in Cartesian coordinates of the distance between said moving bodies and of the east-west component of the relative velocity between said moving bodies, said servo mechanism being arranged so that the output is a rotation proportional to the quotient of of said east-west distance component divided by said east-west relative velocity component, said output thus being proportional to the time of travel for interception in said east-west direction; means for energizing a second servo mechanism with voltages proportional to the north-south component in said Cartesian coordinates of said distance between said moving bodies and of the north-south component of said relative velocity between said moving bodies; said second servo mechanism being arranged so that the output is a rotation proportional to the quotient of said north-south distance component divided by said north-south relative velocity component, said output thus being proportional to the time of travel for interception in said north-south direction; means for connecting said output rotations from the aforesaid servo mechanisms to a mechanical differential mechanism having an output shaft, said differential mechanism being so contrived so that the rotation of said output shaft is the difference in rotation of said input rotations, thus the rotation of said output shaft being proportional to the difference between the times of travel for interception in the north-south and east-west directions; means for connecting said output shaft from said mechanical differential to an input of each of two multiplying devices, said devices also being energized one with the aforementioned voltage proportional to the east-west component of said relative velocity between said moving bodies and the other with the aforementioned voltage proportional to the north-south component of said relative velocity between said moving bodies, said multiplying devices multiplying aforesaid time difference with the respective relative velocity components so that the electrical output from each of said multiplying devices is proportional to a component of aforesaid error distance from interception between said two moving bodies; means for rectifying said output voltages from the aforesaid multiplying devices to produce other voltages proportional to the magnitude and direction of aforesaid components of said error distance from interception; and means for connecting said rectifier output voltages each to one of two indicating devices, said indicating devices being so calibrated as to indicate the actual magnitude and direction of said components of error distance of interception along said north-south and said east-west axes of said Cartesian coordinate system.

3. In a system providing data proportional to first and second components in Cartesian coordinates of the distance between two bodies, at least one of which is moving, and data proportional to first and second components of the relative velocity of said two bodies in directions respectively parallel to said distance components, apparatus for computing the error distance from interception between said two bodies comprising, first means responsive to said data representing said first distance component and said first velocity component and providing data proportional to the quotient thereof, said quotient being proportional to a first travel time to interception in the direction of said first distance component, second means responsive to said second distance component and said second velocity component and providing data proportional to the quotient thereof, said quotient being proportional to a second travel time to interception in the direction of said second distance component, means responsive to said data representing said first and second travel times and providing data proportional to the difference thereof, means responsive to said data representing said time difference and said data representing said first velocity component and providing data proportional to the product thereof, said product being proportional to the error distance from interception in the direction of said first distance component, means responsive to said data representing said time difference and said data representing said second velocity component and providing data proportional to the product thereof, said last-mentioned product being proportional to the error distance from interception in the direction of said second distance component, and indicator means responsive to said data representing said error distances for displaying said last-mentioned data in a usable form.

4. Apparatus as in claim 3 wherein said data representing said distance components, said velocity components and said time difference has sense as well as magnitude and wherein said means providing data proportional to the products of said data representing said velocity components and said time difference provides data having characteristics indicative of the directions and magnitudes of said error distances from interception.

5. In a system providing voltages proportional to first and second components in Cartesian coordinates of the distance between two bodies, at least one of which is moving, and voltages proportional to first and second components of the relative velocity of said two bodies in directions respectively parallel to said distance components, apparatus for computing the error distance from interception between said two bodies comprising, first and second servo mechanisms, means for energizing said first servo mechanism at first and second inputs, respectively, with said voltage proportional to said first component of distance and said voltage proportional to said first component of relative velocity, means for energizing said second servo mechanism at first and second inputs, respectively, with said voltage proportional to said second component of distance and said voltage proportional to said second component of velocity, each of said servo mechanisms being arranged so that the output thereof is a shaft rotation proportional to the quotient of said distance component divided by said velocity component applied thereto, a mechanical differential coupled at first and second inputs, respectively, to the outputs of said first and second servo mechanisms, said mechanical differential having an output shaft, the position of said output shaft of said differential being determined by the difference in input rotations applied to said differential, means for connecting said output shaft from said mechanical differential to the input of first and second multiplying devices, said first and second multiplying devices being energized respectively by said voltages proportional to said first and second components of relative velocity, rectifying means coupled to the outputs of said multiplying devices and indicating means coupled to the outputs of said rectifying means, said rectifying means and said indicating means being arranged so that the magnitude and direction of the products of said time difference and said voltages representing components of relative velocity are indicated on said indicating means.

6. Apparatus as in claim 5 wherein said first and second servo mechanisms each comprise a signal divider having a movable signal extracting element, the position of said signal extracting element determining the fraction of the signal applied to said signal divider appearing at said signal extracting element, said signal divider being energized by said voltage representing the component of relative velocity, a servo computer energized by said voltage representing said distance component and said signal at said signal extracting element and a motor controlled by said servo computer and mechanically coupled to said signal extracting element to position said signal extracting element, said servo mechanism being arranged to drive to a condition in which the signal at said signal extracting element bears a predetermined relationship in amplitude and sense to the signal representing said distance component.

7. In a system providing voltages proportional to first and second components in Cartesian coordinates of the distance between two bodies, at least one of which is moving, and voltages proportional to first and second components of the relative velocity of said two bodies in directions respectively parallel to said distance components, apparatus for computing the error distance from interception between said two bodies comprising, first and second servo mechanisms, means for energizing said first servo mechanism at first and second inputs, respectively, with said voltage proportional to said first component of distance and said voltage proportional to said first component of relative velocity, means for energizing said second servo mechanism at first and second inputs, respectively, with said voltage proportional to said second component of distance and said voltage proportional to said second component of velocity, each of said servo mechanisms comprising, a signal divider having a movable signal extracting element, the position of said signal extracting element determining the fraction of the signal applied to said signal divider appearing at said signal extracting element, said signal divider being energized by said voltage representing the component of relative velocity, a servo computer energized by said voltage representing said distance component and said signal at said signal extracting element, and a motor controlled by said servo computer and mechanically coupled to said signal extracting element to position said signal extracting element, said servo mechanisms being arranged to drive to a condition in which a signal at said signal extracting element bears a predetermined relationship in amplitude and sense to the signal representing said distance component, a mechanical differential coupled to the shafts of said motors in said first and second servo mechanisms, the output of said mechanical differential being a shaft rotation equal to the difference in position between the shaft of the motor in said first servo mechanism and the shaft of the motor in said second servo mechanism, third and fourth signal dividers energized respectively by said voltages representing said first and second components of relative velocity, each of said third and fourth signal dividers having a movable signal extracting element mechanically coupled to the output of said mechanical differential, first and second phase rectifiers coupled respectively to the signal extracting element of said third and fourth signal dividers and first and second indicating means coupled respectively to said first and second phase rectifiers for indicating the error distances from interception in directions parallel to said first and second components of distance.

No references cited.